(12) United States Patent
Sartor et al.

(10) Patent No.: US 7,843,607 B2
(45) Date of Patent: Nov. 30, 2010

(54) METHOD FOR PROCESSING DIGITAL IMAGE DATA

(75) Inventors: Piergiorgio Sartor, Fellbach (DE); Altfried Dilly, Stuttgart (DE)

(73) Assignee: Sony Deutschland GmbH, Cologne (DE)

(*) Notice: Subject to any disclaimer, the term of this patent is extended or adjusted under 35 U.S.C. 154(b) by 1224 days.

(21) Appl. No.: 11/345,524

(22) Filed: Feb. 2, 2006

(65) Prior Publication Data

US 2006/0187490 A1 Aug. 24, 2006

(30) Foreign Application Priority Data

Feb. 23, 2005 (EP) .................................. 05003941

(51) Int. Cl.
*H04N 1/405* (2006.01)
*H04N 1/407* (2006.01)
*G03F 3/08* (2006.01)

(52) U.S. Cl. ...................... 358/3.13; 358/3.27; 358/518

(58) Field of Classification Search ................ 358/3.13, 358/518, 3.27
See application file for complete search history.

(56) References Cited

U.S. PATENT DOCUMENTS

| | | | | | |
|---|---|---|---|---|---|
| 4,817,175 | A | * | 3/1989 | Tenenbaum et al. | 382/303 |
| 5,434,931 | A | * | 7/1995 | Quardt et al. | 382/271 |
| 5,546,194 | A | * | 8/1996 | Ross | 358/445 |
| 5,604,824 | A | * | 2/1997 | Chui et al. | 382/248 |
| 5,764,374 | A | * | 6/1998 | Seroussi et al. | 382/244 |
| 6,665,435 | B1 | * | 12/2003 | Caldato et al. | 382/166 |
| 6,792,160 | B2 | * | 9/2004 | Shaw et al. | 382/272 |
| 2002/0186770 | A1 | * | 12/2002 | Jawerth et al. | 375/240.12 |
| 2006/0092474 | A1 | * | 5/2006 | Ramsay et al. | 358/3.27 |

FOREIGN PATENT DOCUMENTS

EP 1 482 447 A1 12/2004

* cited by examiner

*Primary Examiner*—Benny Q Tieu
*Assistant Examiner*—Sunil Chacko
(74) *Attorney, Agent, or Firm*—Oblon, Spivak, McClelland, Maier & Neustadt, L.L.P.

(57) ABSTRACT

A method for processing digital image data (ID) is proposed wherein a step (B) of processing digital image data (ID) comprises or realizes a sub-step (B') of image improvement with respect to said digital image data (ID) which uses or which is based on a process of re-mapping (REM) together with a process of dithering (DIT).

18 Claims, 4 Drawing Sheets

METHOD FOR PROCESSING DIGITAL IMAGE DATA

The present invention relates to a method for processing digital image data. More particular, the present invention relates to a method for histogram equalization and linearity correction with dithering.

In the field of the development of multi-media applications and devices as well as with respect to the field of the development of customer devices, processing of digital image information becomes more and more important. Therefore, different processing engines have been proposed in order to realize the computational burden with respect to processes of image conversion and image correction. However, already methods and processes have the drawback, that during the processes of converting or correcting inches visible artefacts within the image information are often inherently generated which degrade the quality of the images.

It is therefore an object underlying the present invention to provide a method for processing digital image data which is particular reliable at a reduced amount of inherently generated artefacts.

The object is achieved by a method for processing digital image data according to independent claim 1. Preferred embodiments of the inventive method for processing digital image data are within the scope of the dependent sub-claims. The object is also achieved by an apparatus for processing digital image data, by a computer program product, as well as by a computer readable storage medium according to independent claims 20, 21, and 22, respectively.

The method for processing digital image data according to the present invention comprises a step (A) of providing digital input image data as digital image data to be processed, a step (B) of processing said digital image data in order to generate processed digital image data, and a step (C) of providing as a processing result said processed digital image data as digital output image data, wherein said step (B) of processing said digital image data comprises or realizes a substep (B') of image improvement with respect to said digital image data and wherein said step (B') of image improvement with respect to said digital image data uses or is based on a process of re-mapping together with a process of dithering.

It is therefore a key idea of the present invention to design the step of processing said digital image data and in particular the sub-step of picture improvement with respect to said digital image data by using or basing said processes on a process of re-mapping together with a process of dithering. Thereby an enhanced quality of the processed images can be achieved.

According to a preferred embodiment of the method for processing digital image data according to the present invention said step (B) of processing said digital image data uses or is based on a process of histogram equalization or HE.

Additionally or alternatively, according to a further embodiment of the method for processing digital image data according to the present invention said step (B) of processing said digital image data uses or is based on a process or an arbitrary plurality of processes of the group consisting of a correction, a linearity correction or LIN, of a correction for luminance and of a correction for chrominance.

Further additionally or alternatively, according to a further advantageous embodiment of the method for processing digital image data according to the present invention said process of re-mapping uses or is based on a re-mapping function or re-mapping curve.

The re-mapping function or re-mapping curve may given by a functional relation f according to a general formula $$\text{out}(j):=f(\text{in}(j)), \text{ e.g. by } \text{out}(j):=m\cdot\text{in}(j)+b,$$

for instance by out(j):=2,5·in(j)+3 with m, b being real numbers, connecting input values in(j) and output values out(j).

Said process of re-mapping may uses or may be based on a lookup table table(·) according to a general formula $$\text{out}(j):=\text{table}(\text{in}(j))$$

connecting input values in(j) and output values out(j).

Said process of re-mapping may additionally or alternatively use or be based on a process of generic re-mapping according to a further preferred embodiment of the method for processing digital image data according to the present invention.

Said process of re-mapping and in particular said re-mapping function or re-mapping curve may additionally or alternatively be realized with an extended resolution or extended precision according to a further preferred embodiment of the method for processing digital image data according to the present invention.

Said extended resolution may be realized via enlarged or extended codes or code lengths or an increased number of codes, in particular for input and/or output processes.

Said enlarged or extended codes or code lengths or said increased number of codes may be chosen and/or may be adapted in order to cover conventionally missing codes.

Additionally or alternatively, according to a further embodiment of the method for processing digital image data according to the present invention for each unprocessed pixel of one or of each image contained in said digital image data to be processed a processing error may be determined and said processing error may be diffused or distributed over unprocessed pixels within a given neighbourhood of said unprocessed pixel of said respective image.

Said process of distributing or diffusing said error may according to a further embodiment of the method for processing digital image data according to the present invention be performed according to a Floyd-Steinberg-type-algorithm.

According to a further preferred embodiment of the method for processing digital image data according to the present invention said processing error may be determined as a difference between an original and unprocessed pixel to be processed and a pixel which is obtained by mapping back to an original space a quantized version of the re-mapped original unprocessed pixel which has been processed.

According to a still further preferred embodiment of the method for processing digital image data according to the present invention a transfer function may be determined, truncated to a native or canonical precision but still represented in extended precision and then re-mapped back with an extended precision.

Additionally or alternatively, according to a advantageous embodiment of the method for processing digital image data according to the present invention said digital image data to be processed may contain or may represent one single image or a pluarilaty of single images.

Further additionally or alternatively, according to a further advantageous embodiment of the method for processing digital image data according to the present invention said digital image data to be processed contain or represent one sequence of images or a pluarilaty of sequence of images, e.g. a video stream.

According to a further aspect of the present invention an apparatus for processing digital image data is provided which is adapted and which comprises means in order to carry out a method for processing digital image data according to the present invention and the steps thereof.

A particular hardware device may comprise a certain number of line memories, lookup tables and/or processing units as well a one or a plurality of dethering engines. In the case of a Floyd-Steinberg algorithm, two line memeories are provided, i.e. two line delay processings.

As described, one pixel at a time can be processed in extended precision. The error will be calculated by inverse processing. The error is spread to the neighbour pixels, e.g. the next pixel and three down. The line memories a preferably with extended precision since they will contain extended precision data for a successive pixel to be processed According to a further aspect of the present invention a computer program product is provided comprising computer program means which is adapted in order to realize the method for processing digital image data according to the present invention and the steps thereof when it is executed on a computer or a digital signal processing means.

According to a still further aspect of the present invention a computer readable storage medium is provided comprising a computer program product according to the present invention.

These and further aspects of the present invention will be further discussed in the following:

The present invention inter alia relates to a method for histogram equalization and linearity correction with dithering of digital image data. The invention inter alia proposes a new method to perform luminance and/or chrominance correction of pictures, using histogram equalization and/or generic re-mapping, together with dithering.

Problem

When performing a re-mapping operation on digital system, specifically the luminance of a picture or series of pictures, visible artefacts can occur, if the curve is non-linear. These are mainly quantization errors, when several input codes are mapped to the same output code, or missing codes, when some output codes are never mapped from any of the input codes.

Concept

The concept is mainly based on histogram equalization for picture improvement, but is not mandatory to perform a full equalization; just a re-mapping curve is needed.

The idea is to calculate or provide a re-mapping curve in extended resolution, i.e. with more codes for input and output than the original space has. That is to say, more bits than the current system has as native dynamic range.

Currently the increased number of codes should be able to cover the missing codes that the normal non-extended re-mapping curve will have.

The operation is as follow: re-mapping is applied, the output code is quantized and mapped back to the original space, leading to a value with some decimal part. The difference between the input value and this new value is the error. This is then distributed to the neighbour or neighbour of unprocessed pixels, e.g. by means of a Floyd-Steinberg algorithm.

This means that first the transfer function is calculated with extended precision, truncated to the native precision and than remapped back, still with extended precision. The error calculated by this processes is than distributed or diffused to the pixels around the processed one.

This will lead immediately to solve the quantization issues, as dithering does, and to create new codes for the next re-mapping operation, since the unprocessed pixels will have a decimal part that is non zero.

At the end, the code size must be preserved, so the extended code will be quantized to the original size, cutting the decimal part, as it happens in normal dithering algorithms.

Of course the quantization level can also be different than the simple extended decimal part, it could be for example display dependent. So a quantization curve can be provided in order to decide what is the quantization for each processed code value.

EXAMPLE

Let a picture be based on a precision of an 8-bit representation.

It is possible to calculate a re-mapping curve with 12-bit precision, instead of simple 8-bit. The decimal part will represented by the lower 4 bits, leading to an overall gain of 16. The curve will have 4096 input codes and at least 256 different output codes, i.e. 4096 in total.

The input code from the picture will be Y·16, the error will be $$E = inv\_remap(quant(remap(Y*16))) - Y \cdot 16$$

which will be diffused to the neighbour unprocessed pixels creating new input codes. Where quant(·) denotes the quantization operation, remap(·) denotes the re-mapping function and inv_remap(·) denotes the inverse re-mapping function. The error is the number represented by the 4 lower bits.

In this case, a new code $$Z_{new} = Z \cdot 16 + E \cdot p,$$

where p is the weight of the error E accordingly to the proper error diffusion algorithm, will be created, replacing the old Z·16 value.

The remapping operation for Z will be applied to $Z_{new}$ and will be remap($Z_{new}$), which will map possibly to a different value than simple remap(Z·16), so potentially covering the missing codes.

Of course, the final values will be divided by 16, in order to have still 8-bit resolution.

According to the present invention an enhanced or optimal quality for given conditions can be achieved.

The present invention also relates to a histogram equalization HE and panel correction. In particular a model for histogram equalization (HE) and transfer function correction (TFC) with dithering is proposed. Thereby, concepts of error measurement, feedback control and dithering are introduced. The processing and display errors are according to the present invention calculated and used in order to reduce and/or to eliminate artefacts which are caused by cascading finite precision processings which conventionally occur.

The processing and display errors will be calculated and used in order to reduce/eliminate the artefacts caused by cascading finite precision processing.

The process of dithering is applied between an input video signal and the processed—inverse processed signal. This is necessary in order to calculate the error used for dithering. The extended precision or EP connection can be of a floating point type or of a type with more than 8 bit, for example 12 bit or 16 bit. It has to keep information. The 8 bit connection can also be replaced by a 10 bit or more, specifically in the output section. This depends on panel. Input is usually always represented at a 8 bit level.

The histogram measurement retrieves the histogram data in order to perform the equalization later. In this embodiment it also prepares the extended precision or EP signal. That is, for example, converting the data from an 8 bit representation to a floating point representation.

The HE or histogram equalization process can be of any type known, not only the classic one.

Inverse HE is the inverse operation of the HE transfer function, as calculated previously in the HE block.

The panel model can hold more than a simple curve. For example it can consider temporal aspects, like response time.

Other processing—with inverse, where applicable—can be added in the chain. Or only the correction function—i.e. without a HE process—can be used.

The invention will now be explained based on preferred embodiments thereof and by taking reference to the accompanying and schematical figures.

In the following, elements which are similar, comparable or equivalent with respect to their structure and/or function will be denoted with the same reference symbols. Not in each case of their occurrence a full and completed description is repeated.

FIG. 1 is a schematical block diagram for elucidating basic aspects of an embodiment of the inventive method for processing digital image data ID. FIG. 1 shows a flow charge for different processing steps within the embodiment for the inventive method.

After an initializing starting step START in a first step S1 which represents said step (A) of providing digital input image data IID digital input image data IID are provided as image data ID to be processed. The provision of said image data ID to be processed can be realized by a process of recalling said digital image data ID—e.g. from dome storage means—or by a process of receiving said digital image data ID to be processed, e.g. in a real-time manner.

The received digital image data ID to be processed are then fed into a step S2 or (B) of processing said digital image data ID in order to obtain processed digital image data PID. Said step S2 or (B) of processing said digital image data ID comprises or is based on a step (B') of improving an image I which is contained in or realized by said digital image data ID to be processed. Said step (B') of image improvement with respect to said image I comprises or is realized at least by a process of re-mapping REM and a process of dithering DIT.

The result of the processing S2 or (B) is fed into a next step S3 or (C) of providing said processed digital image data PID as digital output image data OID.

Figure 1:
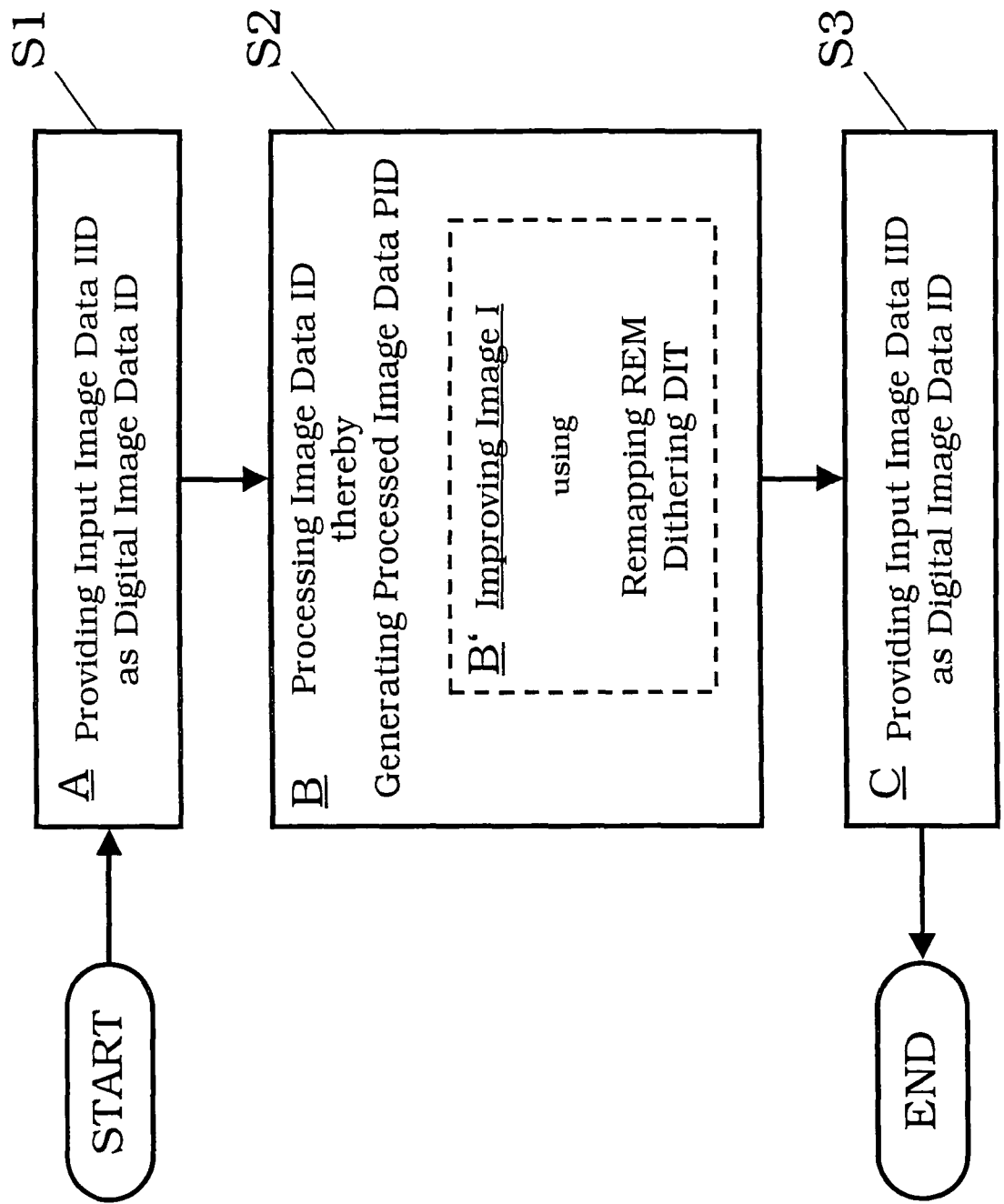
FIG. 1 is a schematical block diagram describing basic aspects of an embodiment of the method for processing digital image data according to the present invention.

After this final step the processing scheme according to FIG. 1 is terminated according to a process END.

Figure 2:
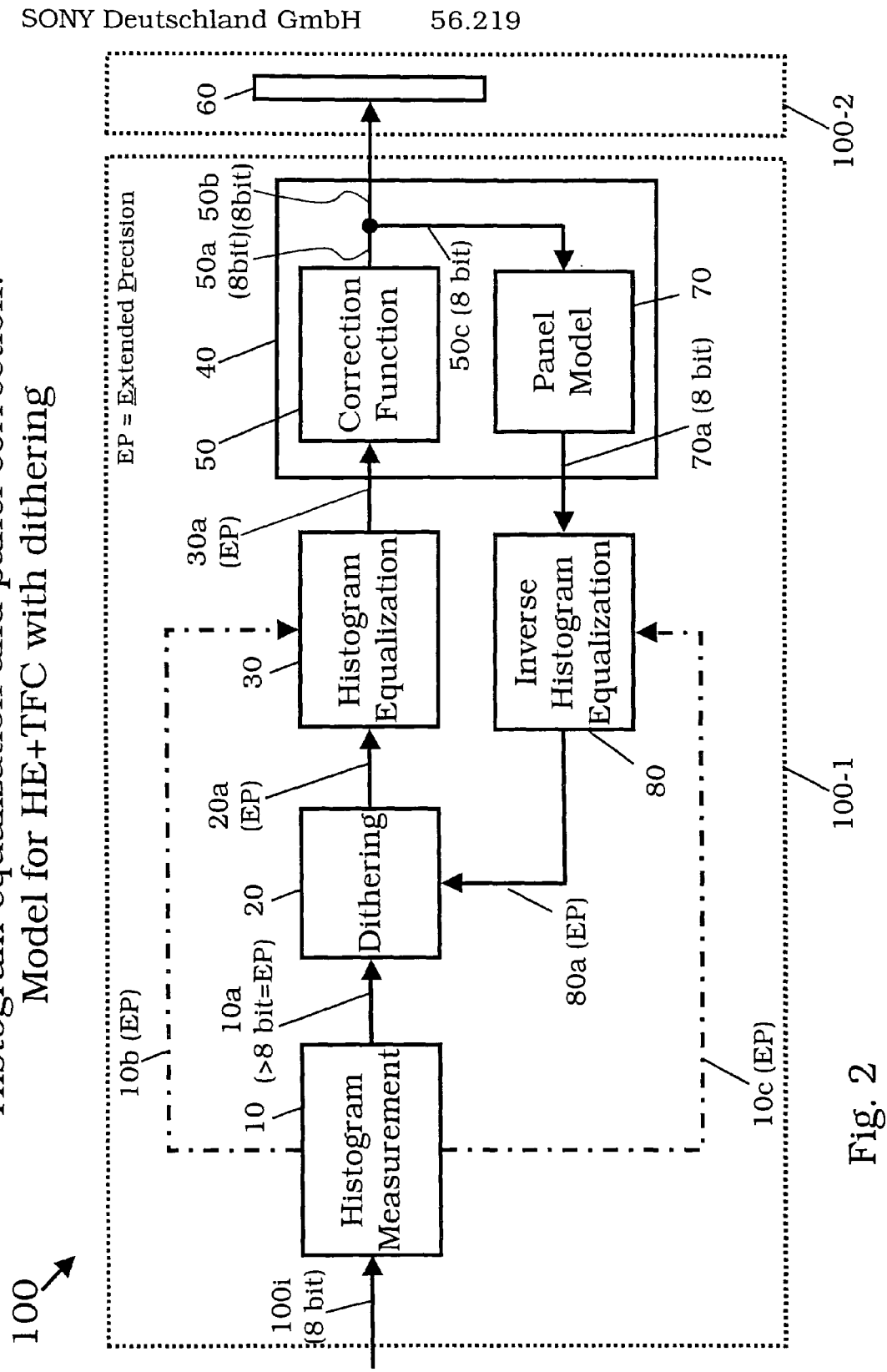
FIG. 2 is a schematical block diagram elucidating some details of an embodiment of the method for processing digital image data according to the present invention.

FIG. 2 is a schematical block diagram for elucidating details of an embodiment for the method for processing digital image data ID according to the present invention.

The block diagram of FIG. 2 is representative for an embodiment of the inventive method itself as well as for a device 100 or an apparatus 100 for carrying out the inventive method.

The block diagram of FIG. 2 therefore represents a possible model for histogram equalization HE with transfer function correction TFC together with dithering DIT.

Block element 100-1 represents the essentials for an embodiment of a method for processing digital image data ID. Via a data input line or connection 100i digital input image data IID are provided in order to be processed by the method block 100 of the embodiment of FIG. 2 as digital image data ID to be processed. The accuracy or precision of the representation for the digital input image data IID is according to the example of FIG. 2 8 bit.

It follows a method block 10 which represents a process of histogram measurement with respect to the image data ID. The result of the histogram measurement is provided via a data line or connection 10a with an extended precision EP which is above the native or canonical precision or accuracy of 8 bit.

The result of the histogram measurement is therefore fed into a method block 20 for a dithering process.

The result of the dithering process is fed via a further data line or connection 20a to a following method block 30 performing a histogram equalization HE.

The following method block 40 is built up by a method block 50 for a correction function and by a method block 70 for modelling a display panel.

The correction function method block 50 receives the result of the histogram equalization 30 in extended precision EP via a data line or connection 30a. The result of applying the correction function is a processed image I' based on processed digital image data PID and is displayed by supplying a panel 60 with the result of the application of the correction function 50 via data lines or connections 50a and 50b with a conventional or native or canonical precision of 8 bit.

The panel process or displaying process 60 is contained within a further method block 100-2 of the method shown in FIG. 2 and it is not a mandatory component of the method for processing digital image data ID according to the present invention as such.

In order to realize the inventive concept some feedback structures are necessary.

First of all the result of the application of the correction function is also fed from output data line or connection 50a via additional data line or connection 50c to the method block 70 for modelling a panel or a display panel.

The result of panel modelling is fed via data line or connection 70a with a precision of 8 bit to a further method block 80 for performing an inverse histogram equalization.

The result of the application of the inverse histogram equalization 80 is fed via data line or connection 80a to the dithering method block 20 with extended precision EP.

Therefore the corrected image including a panel model is fed back into the process of histogram equalization.

Via data lines or connections 10b and 10c the process of histogram equalization 30 and the process of inverse histogram equalization 80 are controlled by the input data.

Figure 3:
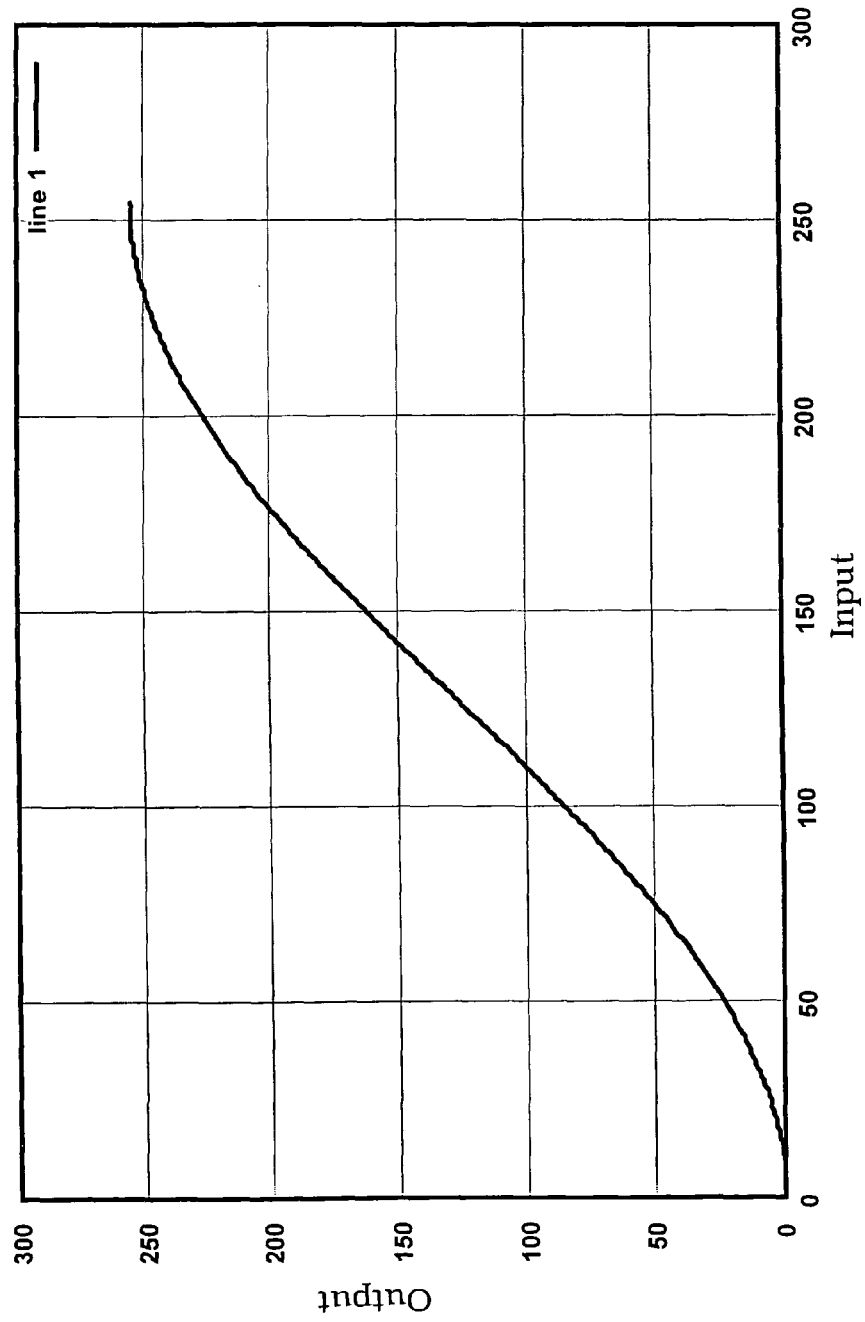
FIG. 3 is a graphical representation for a display transfer function according to a preferred embodiment of the present invention.
Figure 4:
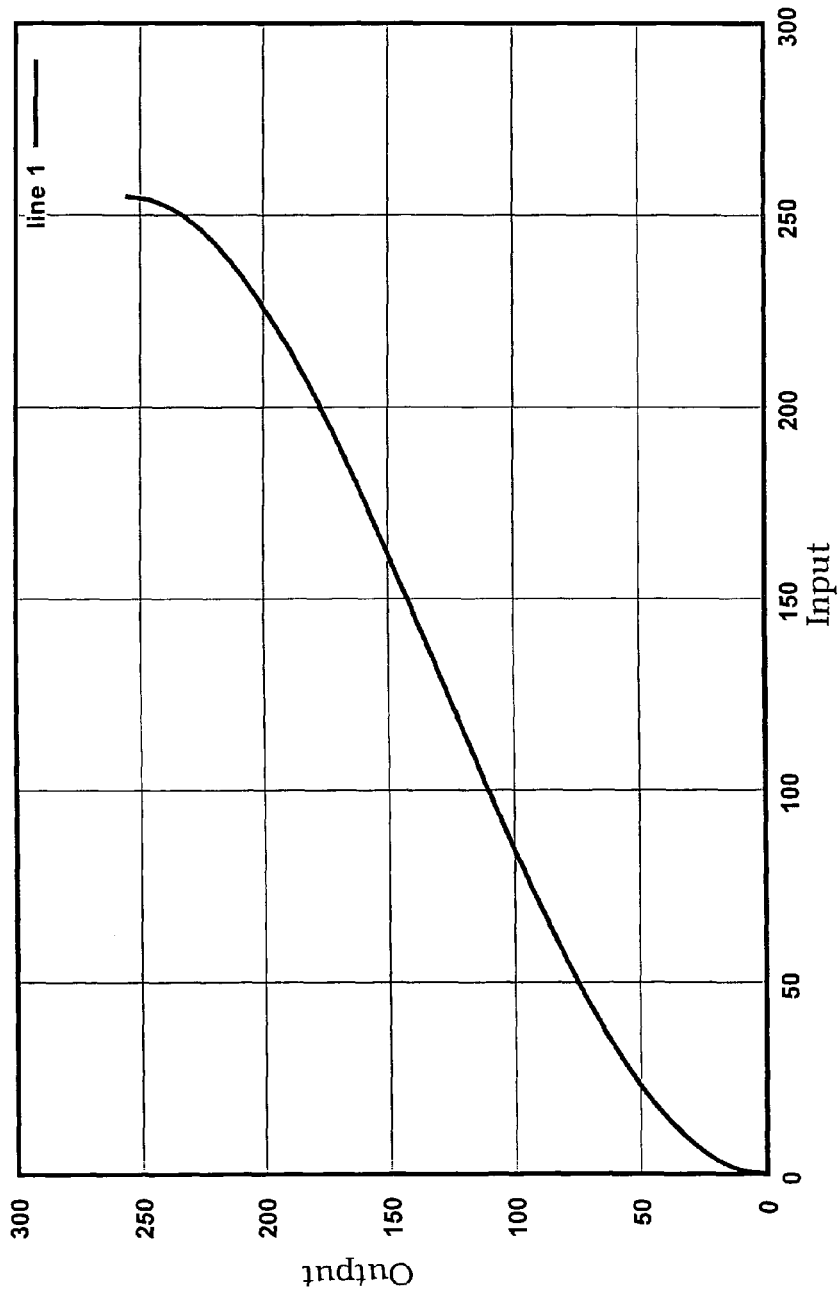
FIG. 4 is a graphical representation for a correction function according to a preferred embodiment of the present invention.

FIGS. 3 and 4 are graphical representations for an example of the panel model or the display transfer function and an example for the correction function, respectively, wherein each case the output on the ordinate is given as a function of the input on the abscissa.

| Reference Symbols | |
| --- | --- |
| 10 | step or process of histogram measurement |
| 10a | data line/connection |
| 10b | data line/connection |
| 10c | data line/connection |
| 20 | step or process of dithering |
| 20a | data line/connection |
| 30 | step or process of histogram equalization |
| 30a | data line/connection |
| 40 | |

-continued

| Reference Symbols | |
|---|---|
| 50 | step or process of application of correction function |
| 50a | data line/connection |
| 50b | data line/connection |
| 50c | data line/connection |
| 60 | panel process, display process |
| 70 | step or process of panel modelling |
| 70a | data line/connection |
| 80 | step or process of inverse histogram equalization |
| 80a | data line/connection |
| 100 | apparatus/method for processing digital image data ID according to the present invention |
| 100-1 | processing block |
| 100-2 | display/panel block |
| 100i | input data line/connectiion |
| I | image, input image |
| I' | processed image |
| ID | digital image data to be processed |
| IID | digital input image data |
| OID | digital output image data |
| PID | processed digital image data |
| P | pixel |
| P' | processed pixel |
| P* | Processed pixel which is re-mapped back |

The invention claimed is:

1. A method for processing digital image data in an apparatus for processing digital image data, comprising:
processing, using the apparatus, the digital image data having a predetermined number of bits per pixel value based on a re-mapping function having an extended number of bits per pixel value, thereby obtaining first processed image data with extended number of bits per pixel value, wherein the extended number is greater than the predetermined number;
quantizing the first processed image data by truncating the first processed image data to the predetermined number of bits per pixel value, thereby obtaining second processed image data;
processing, using the apparatus, the second processed image data based on an inverse re-mapping function with extended number of bits per pixel value, thereby obtaining third processed image data with extended number of bits per pixel value, the inverse re-mapping function being the inverse function of the re-mapping function;
determining error data with extended number of bits per pixel value based on a difference between the digital image data and the third processed image data;
distributing the error data by dithering thereby obtaining fourth processed image data with extended number of bits per pixel value; and
quantizing fourth processed image data to the predetermined number of bits per pixel value.

2. The method according to claim 1,
wherein processing the digital image data is based on histogram equalization.

3. The method according to claim 1,
wherein processing the digital image data is based on a process of correction for improving the digital image data.

4. The method according to claim 1,
wherein processing the digital image data is based on linearity correction.

5. The method according to claim 1,
wherein processing the digital image data is based on correction of luminance.

6. The method according to claim 1,
wherein processing the digital image data is based on correction of chrominance.

7. The method according to claim 1,
wherein said re-mapping function is based on a re-mapping curve.

8. The method according to claim 1,
wherein the re-mapping function or re-mapping curve is given by a functional relation f according to a general formula $$\text{out}(j) := f(\text{in}(j)), \text{ e.g. by } \text{out}(j) := m \cdot \text{in}(j) + b,$$

with m, b being real numbers, connecting input values in(j) and output values out(j).

9. The method according to claim 1,
wherein the re-mapping function is based on a lookup table table(·) according to a general formula $$\text{out}(j) := \text{table}(\text{in}(j))$$

connecting input values in(j) and output values out(j).

10. The method according to claim 1,
wherein the re-mapping function is based on generic re-mapping.

11. The method according to claim 1,
wherein for each unprocessed pixel of each image contained in the digital image data, a processing error is determined, and
wherein said processing error is distributed over unprocessed pixels within a given neighbourhood of said unprocessed pixel of said respective image.

12. The method according to claim 11,
wherein said process of distributing said error is performed according to a Floyd-Steinberg-type-algorithm.

13. The method according to claim 11, wherein said processing error is determined as a difference between an original and unprocessed pixel to be processed and a pixel which is obtained by mapping back to an original space a quantized version of the re-mapped original unprocessed pixel which has been processed.

14. The method according to claim 1, wherein a transfer function is determined, truncated to a native or canonical precision but still represented with extended number of bits per pixel value and then re-mapped back with an extended number of bits per pixel value.

15. The method according to claim 1, wherein said digital image data contain or represent one single image or a plurality of single images.

16. The method according to claim 1, wherein said digital image data contain or represent one sequence of images, a plurality of sequence of images, or a video stream.

17. An apparatus for processing digital image data including:
a first digital image processing unit configured to processes the digital image data having a predetermined number of bits per pixel value based on a re-mapping function having an extended number of bits per pixel value, thereby obtaining first processed image data with extended number of bits per pixel value, the extended number being greater than the predetermined number;
a first quantizing unit configured to quantize the first processed image data by truncating the first processed image data to the predetermined number of bits per pixel value, thereby obtaining second processed image data;
a second digital image processing unit configured to process the second processed image data based on an inverse re-mapping function with extended number of bits per pixel value, thereby obtaining third processed image data with extended number of bits per pixel value, the inverse re-mapping function being the inverse function of the re-mapping function;

an error determining unit configured to determine error data with extended number of bits per pixel value based on a difference between the digital image data and the third processed image data;

a dithering unit configured to distribute the error data by dithering thereby obtaining fourth processed image data with extended number of bits per pixel value; and a second quantizing unit configured to quantize fourth processed image data to the predetermined number of bits per pixel value.

18. A non-transitory computer-readable storage medium encoded with computer program instructions which when executed by a computer cause the computer to execute a method of processing digital image data comprising:

processing the digital image data having a predetermined number of bits per pixel value based on a re-mapping function having an extended number of bits per pixel value, thereby obtaining first processed image data with extended number of bits per pixel value, the extended number being greater than the predetermined number;

quantizing the first processed image data by truncating the first processed image data to the predetermined number of bits per pixel value, thereby obtaining second processed image data;

processing the second processed image data based on an inverse re-mapping function with extended number of bits per pixel value, thereby obtaining third processed image data with extended number of bits per pixel value, the inverse re-mapping function being the inverse function of the re-mapping function;

determining error data with extended number of bits per pixel value based on a difference between the digital image data and the third processed image data;

distributing the error data by dithering thereby obtaining fourth processed image data with extended number of bits per pixel value; and quantizing fourth processed image data to the predetermined number of bits per pixel value.

* * * * *